Figure 1:
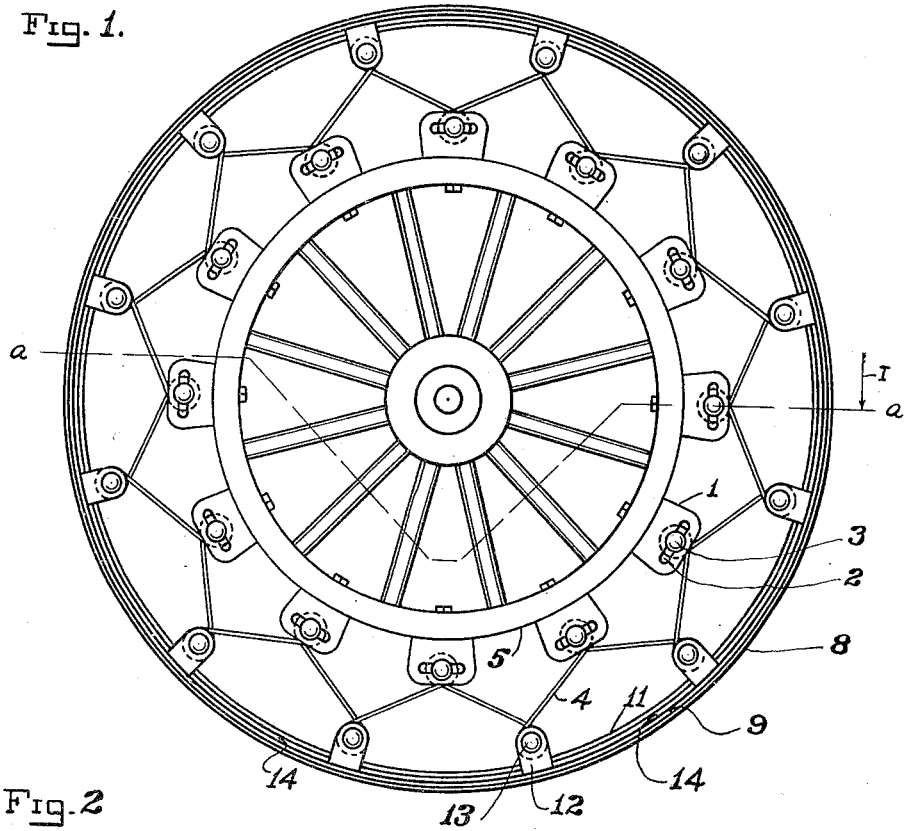

G. E. DARGATZ.
ELASTIC METAL TIRE.
APPLICATION FILED JAN. 24, 1912.

1,087,731.

Patented Feb. 17, 1914.

2 SHEETS—SHEET 1.

WITNESSES:
Darius A. Brown
David A. Moses

INVENTOR.
G. Emil Dargatz
BY Wm. J. Davis
ATTORNEY.

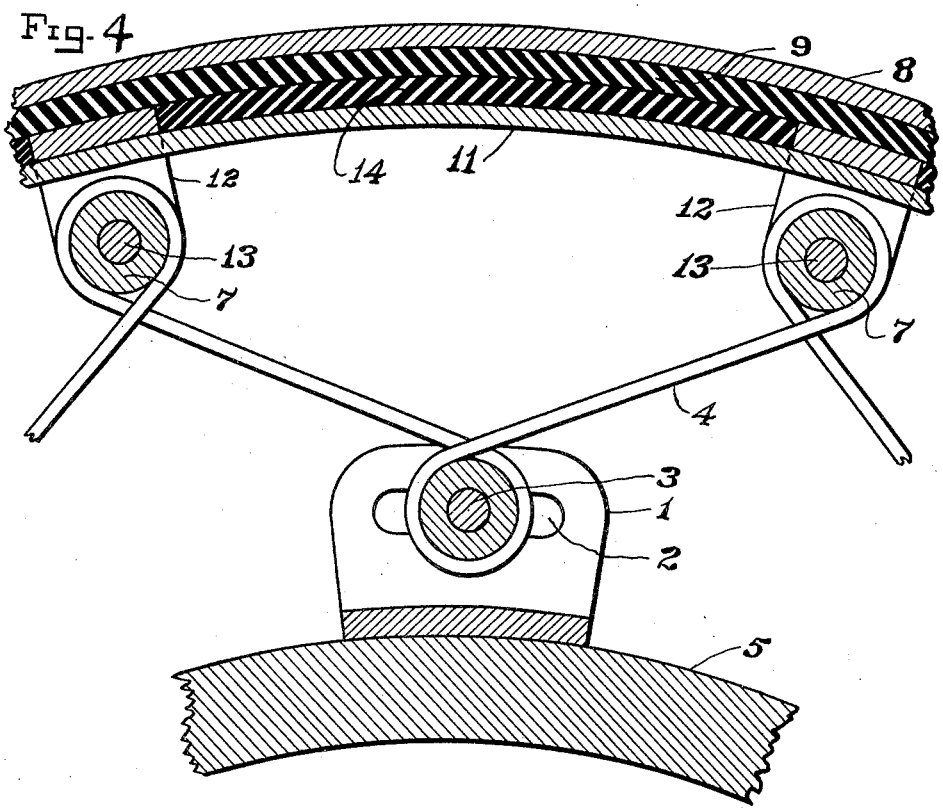

UNITED STATES PATENT OFFICE.

GUSTAV EMIL DARGATZ, OF KANSAS CITY, MISSOURI.

ELASTIC METAL TIRE.

1,087,731.  Specification of Letters Patent.  Patented Feb. 17, 1914.

Application filed January 24, 1912. Serial No. 673,205.

*To all whom it may concern:*

Be it known that I, GUSTAV EMIL DARGATZ, a citizen of the United States, residing at Kansas City, in the county of Jackson and State of Missouri, have invented certain new and useful Improvements in Elastic Metal Tires, of which the following is a full, clear, and exact description, such as will enable others skilled in the art to which it appertains to make and use the same.

The invention relates to an elastic metal tire for automobiles, vehicles, and the like, and seeks to provide a simple and effective form of tire that may be easily applied to the ordinary automobile or vehicle wheel, to remove the jolting and jar from the vehicle that is usually caused by rough roads.

Automobile wheels are usually fitted with pneumatic tires, but they have proven very unsatisfactory owing to their short life and tendency to be continually out of repair. The expense and inconvenience of keeping pneumatic tires in repair is a constant source of annoyance, and has a tendency to limit the use of the automobile. It is essential that automobile tires be elastic, and yieldingly support the wheel so that the tire may follow the irregularities of the road, and at the same time prevent the roughness of the road from being transmitted to the body of the automobile. For this reason, tires that are used on automobiles must be yielding and elastic, and some form of tire that will remove the annoyance of the necessity of inflating, and the repairs and renewals that have been required in the past, is very desirable.

The present invention seeks to provide an improved tire that is elastic without inflating, that has no parts susceptible to wear, and that will remove the annoyance and expense that has been occasioned by the tires used heretofore.

Some metal tires have been made with the result that they were noisy on the road, and did not possess the elasticity necessary for smooth riding, but, by providing an outer band of spring material, and lining it with rubber or other cushioning material, using a spring supporting band inside the rubber or other material, and then connecting from this to the wheels with a spring of sufficient elasticity, the tire is made noiseless and smooth riding, and the former objections have been removed.

A further object of the invention is to produce an elastic metal tire with a metal outer face that is noiseless.

With these and other objects in view, the invention consists in the features of construction, combinations and arrangements of parts hereinafter set forth, illustrated in the drawings, and particularly pointed out in the claims appended.

Figure 2:
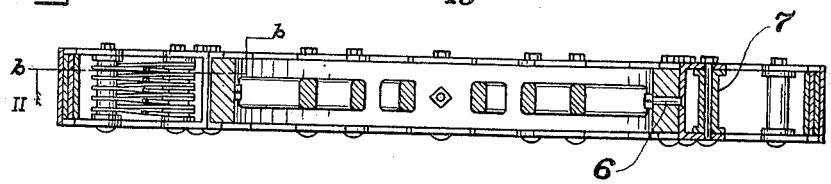
Figure 3:

In the drawings,—Figure 1 is a view in elevation of the improved tire applied to a wheel. Fig. 2 is a section of the tire and wheel on line $a$—$a$ of Fig. 1 looking in the direction of arrow I, but with the spring removed on the right hand side to more clearly show the construction. Fig. 3 is a plan view of a fragment of the spring shown in Figs. 1 and 2. Fig. 4 is a view in vertical section on line $b$—$b$ of Fig. 2 looking in the direction of arrow II.

The inner spring supports 1 are as shown in the form of a wide bifurcated jaw, preferably slotted at 2 to allow bolt 3 to adjust to the action of spring 4 when under tension, and are preferably bolted to the wheel 5 which may be constructed in any suitable manner with bolts 6. Bolts 3 are loosely fitted in slots 2, so that they may, when required, slide from end to end of the slot, and are fitted loosely with thimbles 7 around which the spring 4 is coiled. The thimbles are larger than the bolts 3 and provide a greater bearing surface for springs 4 than if they were coiled directly on the bolts.

The outer band 8 is constructed continuous of spring metal and has a layer of rubber or other cushioning material 9 bearing against the entire inner surface, which prevents the band from vibrating, and where there is no vibration, there is no noise.

The outer spring supports 12 are constructed in like manner as the inner spring supports 1, but the slot 2 is omitted and their position in the tire is reversed, the jaws of both supports facing each other, as shown. Supports 12 bear outwardly against the inner surface of 9 and are held in this position by inner band 11 which is of spring metal, the surface between 11 and 9 diametrally and between the various supports 12 circumferentially, being filled by pieces 14 which are preferably of rubber or other cushioning material. The object of cushioning between bands 11 and 8 is to prevent noise from the running of metal band 8 on the surface of the road.

The spring 4 is preferably continuous, starting on one of the bolts 13, then to bolt 3, and so on around the tire until the space is filled, but always passing around all the bolts.

It will be understood from the foregoing description, that bands 8 and 11 will yield and adjust to the unevenness of the road, and the wheel 5 will, with each jolt, yield downwardly with relation to bands 8 and 11, owing to the elasticity of spring 4 and clearance in slots 2. The slots 2 will allow the wheel 5 to yield downwardly in bands 8 and 11 without stretching the spring 4 perceptibly on the sides regardless of which side of the wheel is up, and the spring 4 will be elastic both at the top and at the bottom of the tire.

It is obvious that the tire will be both noiseless and elastic, and that the wear during a long period of constant use, will be hardly perceptive.

The elastic metal tire is of chief importance in connection with automobiles and the like, but may be advantageously employed in connection with other vehicles as buggies and the like.

It is obvious that numerous changes may be made in the details set forth without departure from the essentials of the invention.

Having described my invention, what I claim as new, and desire to secure by Letters Patent, is:—

1. In an elastic metal tire the combination of, a resilient tread band, a series of bifurcated jaws secured to said tread band and extending radially toward the axis of said band, bolts passing through said jaws parallel to the axis of said tread band, thimbles on said bolts and between said jaws and forming outer spring supports, a wheel within said tread band, bifurcated jaws bolted to the periphery of said wheel with bolts passing through the connecting portion of said jaws and through the rim of said wheel in radial lines extending outward from the axis of said wheel, said jaws extending outward from the periphery of said wheel, bolts passing through said jaws parallel to the axis of said wheel, thimbles on said bolts and between said jaws and forming inner spring supports, and a wire spring beginning near one end of one of said spring supports and advancing circumferentially and spirally around said wheel within said tread band circling said wheel in a series of wraps and circling alternately said outer and said inner spring supports during each successive wrap and ending near the opposite end of one of the spring supports.

2. In an elastic metal tire the combination of, a resilient tread band, a series of bifurcated jaws secured to said tread band and extending radially toward the axis of said band, bolts passing through said jaws parallel to the axis of said tread band, thimbles on said bolts and between said jaws and forming outer spring supports, a wheel within said tread band, bifurcated jaws bolted to the periphery of said wheel with bolts passing through the connecting portion of said jaws and through the rim of said wheel in radial lines extending outward from the axis of said wheel, said jaws extending outward from the periphery of said wheel, slots in said jaws, the direction of each slot being a right angle to a radial line of said wheel, bolts passing through said jaws in said slots and parallel to the axis of said wheel, thimbles on said bolts and between said jaws and forming inner spring supports, and a wire spring beginning near one end of one of said spring supports and advancing circumferentially and spirally around said wheel within said tread band circling said wheel in a series of wraps and circling alternately said outer and said inner spring supports during each successive wrap and ending near the opposite end of one of the said spring supports.

In testimony whereof I affix my signature in the presence of two witnesses.

G. EMIL DARGATZ.

Witnesses:
CLARK E. ADAMS,
ISAAC B. KIMBRELL.